United States Patent
Gajjar (10) Patent No.: US 9,716,793 B2
(45) Date of Patent: *Jul. 25, 2017

(54) SYSTEM AND METHOD TO DETECT AND CORRECT IP PHONE MISMATCH IN A CONTACT CENTER

(71) Applicant: Avaya Inc., Basking Ridge, NJ (US)

(72) Inventor: Hiten Sampat Gajjar, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,454

(22) Filed: Jan. 26, 2016

(65) Prior Publication Data

US 2016/0142545 A1 May 19, 2016

Related U.S. Application Data

(63) Continuation of application No. 14/230,575, filed on Mar. 31, 2014.

(51) Int. Cl.
| | |
|---|---|
| *H04M 3/00* | (2006.01) |
| *H04M 5/00* | (2006.01) |
| *H04M 3/51* | (2006.01) |
| *H04L 29/12* | (2006.01) |
| *H04L 29/06* | (2006.01) |
| *H04M 3/38* | (2006.01) |
| *H04M 7/00* | (2006.01) |

(52) U.S. Cl.
CPC ...... *H04M 3/5191* (2013.01); *H04L 61/2007* (2013.01); *H04L 63/00* (2013.01); *H04L 63/10* (2013.01); *H04M 3/38* (2013.01); *H04M 3/5133* (2013.01); *H04M 7/0078* (2013.01); *H04L 61/1505* (2013.01)

(58) Field of Classification Search
USPC ....................................... 379/265.09, 265.04
See application file for complete search history.

(56) References Cited

U.S. PATENT DOCUMENTS

| | | |
|---|---|---|
| 8,271,618 B1 | 9/2012 | Kridlo |
| 2005/0047579 A1 | 3/2005 | Salame |
| 2007/0162954 A1 | 7/2007 | Pela |

OTHER PUBLICATIONS

Nguyen, Quynh H; Office Action; U.S. Appl. No. 14/230,575; May 15, 2015; United States Patent and Trademark Office; Alexandria, Virginia.

Nguyen, Quynh H; Office Action; U.S. Appl. No. 14/230,575; Aug. 27, 2015; United States Patent and Trademark Office; Alexandria, Virginia.

Nguyen, Quynh H; Notice of Allowance; U.S. Appl. No. 14/230,575; Oct. 14, 2015; United States Patent and Trademark Office; Alexandria, Virginia.

*Primary Examiner* — Quynh Nguyen
(74) *Attorney, Agent, or Firm* — Stevens & Showalter, LLP (57) ABSTRACT

Detecting an IP address mismatch in a contact center includes receiving a workstation login request from a workstation of the center that include login credentials associated with an agent of the center for logging into the workstation. The method also includes retrieving from a database a predetermined first IP address assigned to the agent; receiving an application login request related to an application from a workstation of the center on which the application is executing; extracting a second IP address from the application login request; and comparing the predetermined first IP address with the second IP address and granting the agent access if the addresses match.

20 Claims, 4 Drawing Sheets

SYSTEM AND METHOD TO DETECT AND CORRECT IP PHONE MISMATCH IN A CONTACT CENTER

CROSS-REFERENCE TO RELATED APPLICATIONS

This application is a continuation of U.S. Pat. No. 9,369,580, filed Mar. 31, 2014, the disclosure of which is hereby incorporated by reference in its entirety.

BACKGROUND

Field of the Invention

Embodiments of the present invention generally relate to agent login in a contact center, and, in particular, to a system and method to detect a mismatch between agent workstation login and agent application program login.

Description of Related Art

Contact Center agents typically are able to support customer contacts with a voice media stream (e.g., a voice call) and/or a video media stream (e.g., a video call). The agents typically use an IP phone for the call streaming media. The IP phone may be either a conventional desktop or handheld communication device (i.e., a hardphone), or may be a software telephony client running on the agent's computer terminal (i.e., a softphone). A Contact Center Agent software application typically provides call set up and control functionality for either a voice call or a video call.

Two agent logins typically are involved at a contact center. First, there is a login to the agent's workstation. Second, there is a login to the Contact Center Agent software application client program on the workstation that handles the call. Ordinarily, the agent will log into the Contact Center Agent software application from the same workstation that the agent is logged into. However, sometimes there may be a mismatch between an identity of the agent who is logged into the workstation and an identity of the agent who is logged into the Contact Center software application client program, and the contact center agent may not have an IP phone physically available to use. For example, the agent may have at some point forwarded their calls to a second workstation at which someone else is logged in. The Contact Center product may fail to detect the physical and operational mismatch in the availability of an IP phone, e.g., if there is a mismatch in agent machine login and Contact Center Agent software application login. Background art fails to identify and warn of this mismatch.

Therefore, a need exists to detect a mismatch in agent logins to a workstation and to the contact center software application client program, in order to provide improved detection of some misconfigurations that would affect customer service, and ultimately provide improved customer satisfaction.

SUMMARY

One aspect of the present disclosure relates to a method for detecting an Internet Protocol address mismatch in a contact center. The method includes receiving, by an authentication server, a workstation login request from a first workstation of the contact center, wherein the workstation login request comprises login credentials associated with an agent of the contact center for logging into the first workstation. The method also includes a) retrieving, by the authentication server, from a contact center database a predetermined first Internet Protocol address assigned to the agent, b) receiving, by the authentication server, an application login request related to an application, wherein the application login request is received from a workstation of the contact center on which the application is executing; c) extracting, by the authentication server, a second Internet Protocol address from the application login request, wherein the second Internet Protocol address is that of the workstation on which the application is executing; and d) comparing, by the authentication server, the predetermined first Internet Protocol address with the second Internet Protocol address. Accordingly, the method includes granting, by the authentication server, the agent access to the first workstation and the application when the predetermined first Internet Protocol address matches the second Internet Protocol address.

Another aspect of the present disclosure relates to a system for detecting an Internet Protocol address mismatch in a contact center. The system includes a memory device, storing executable instructions and a processor in communication with the memory device. The processor when executing the executable instructions: a) receives a workstation login request from a first workstation of the contact center, wherein the workstation login request comprises login credentials associated with an agent of the contact center for logging into the first workstation; b) retrieves from a contact center database a predetermined first Internet Protocol address assigned to the agent, c) receives an application login request related to an application, wherein the application login request is received from a workstation of the contact center on which the application is executing; d) extracts a second Internet Protocol address from the application login request, wherein the second Internet Protocol address is that of the workstation on which the application is executing; e) compares the predetermined first Internet Protocol address with the second Internet Protocol address; and f) grants the agent access to the first workstation and the application when the predetermined first Internet Protocol address matches the second Internet Protocol address.

An additional aspect of the present disclosure relates to a contact center that includes a first server configured to assign a respective Internet Protocol address to each of a plurality of workstations in the contact center and a first memory device storing a database, wherein the database comprises: an indication of a respective predetermined physical work area associated with each agent of the contact center, and a respective indication of one or more predetermined Internet Protocol addresses associated with each physical work area. The contact center also includes an authentication server comprising a second memory device, storing executable instructions; and a processor in communication with the second memory device. The processor when executing the executable instructions: a) receives a workstation login request from a first workstation of the contact center, wherein the workstation login request comprises login credentials associated with an agent of the contact center for logging into the first workstation; b) retrieves from a contact center database a predetermined first Internet Protocol address assigned to the agent, c) receives an application login request related to an application, wherein the application login request is received from a workstation of the contact center on which the application is executing; d) extracts a second Internet Protocol address from the application login request, wherein the second Internet Protocol address is that of the workstation on which the application is executing; e) compares the predetermined first Internet Protocol address with the second Internet Protocol address;

and f) grants the agent access to the first workstation and the application when the predetermined first Internet Protocol address matches the second Internet Protocol address. The contact center also includes a network medium connecting the first server, the first memory device, and the authentication server.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to detect mismatch between logins to an agent workstation and agent application.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Users or any other addressable entities in a SIP framework are identified by Universal Resource Identifiers (URI). Each such Internet-style address (for example, sip: johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

SIP is not a vertically integrated communications system. SIP is rather a component that can be used with other IETF protocols to build a complete multimedia architecture. Typically, these architectures will include protocols such as RTP (RFC 3550) for transporting real-time data and providing Quality of Service ("QoS") feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 4566) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically, RTP will be sent on an even-numbered user datagram protocol ("UDP") port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

Automatic Call Distribution ("ACD") is a communication server software feature that processes incoming, outgoing, and internal calls and distributes them to groups of extensions called hunt groups or splits. The communication server also sends information about the operation of the ACD to the Call Management System ("CMS") which stores and formats the data and produces real-time and historical reports on ACD activity. ACD is used by a contact center to route incoming calls to specifically assigned splits/skills and agents. ACD allows a system administrator to create an efficient call management environment.

Figure 1:
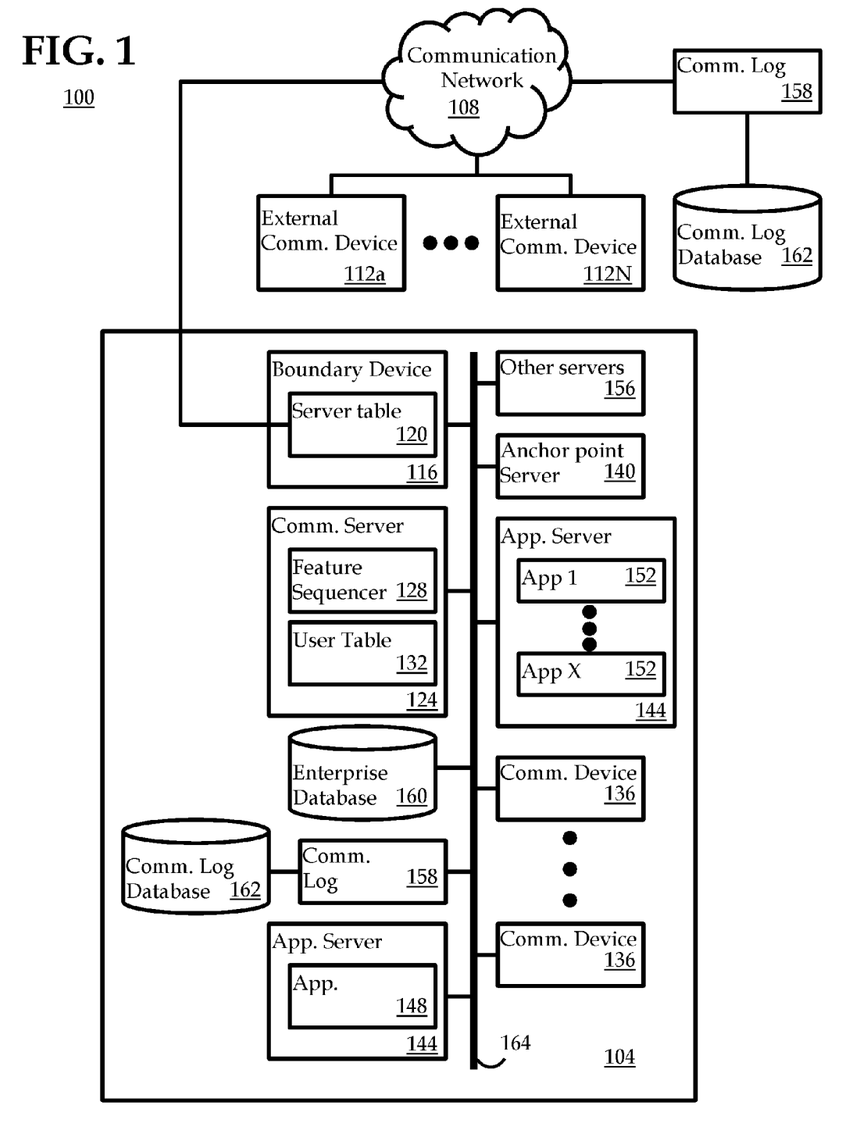
FIG. 1 is a block diagram depicting a system in accordance with an embodiment of the present invention.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112a . . . 112N, where N is an integer, N≥1. An individual but nonspecific external communication device may be referred to as external communication device 112. The external communication device(s) 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users are not necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 may provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

For example, an application server 144 may be configured to perform the functions of an authentication server, i.e., a server that performs authentication functions of a contact center, including login verification and verification of IP addresses when an agent logs in.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multimedia communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Figure 2:
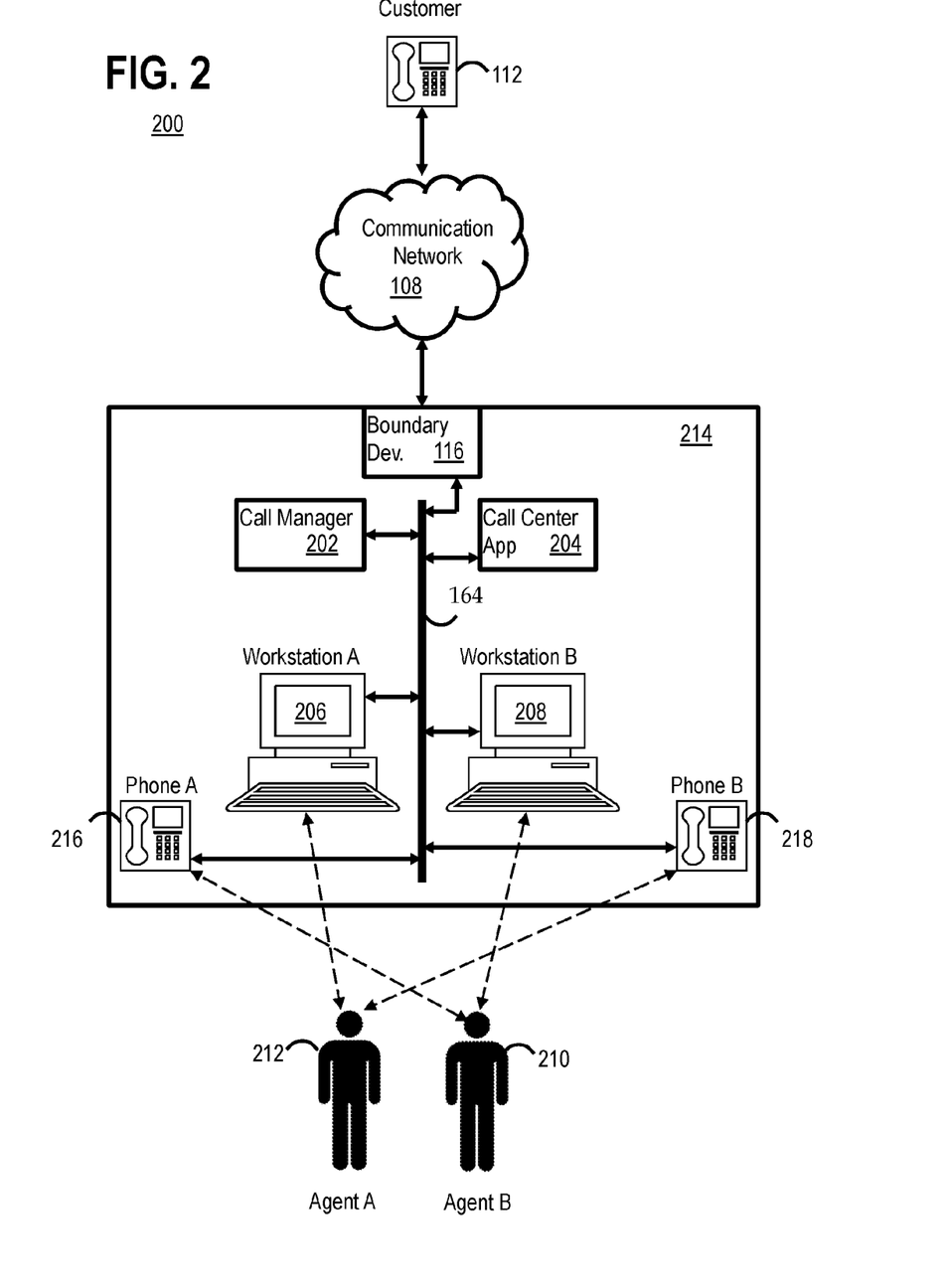
FIG. 2 is a block diagram depicting a misconfigured system in accordance with an embodiment of the present invention.

FIG. 2 illustrates at a high level of abstraction a misconfigured system 200 that is relevant to embodiments of the invention. Enterprise network 214 represents a contact center, and system 200 represents enterprise network 214 at a different level of abstraction compared to enterprise network 104 of FIG. 1. Enterprise network 214 may be in present or imminent communicative contact through communication network 108 with a customer at external communication device 112. Enterprise network 214 includes a call manager 202, a call center application program 204, a workstation-A 206, a workstation-B 208, an IP phone A 216 and an IP phone-B 218, all interconnected by LAN 164 as illustrated in FIG. 2. Call manager 202 may perform ACD functions. Call manager 202 and call center application program 204 may execute on a server such as application server 144. Boundary device 116 interfaces between LAN 164 and communication network 108. Ordinarily, workstation-A 206 and IP phone-A 216 are assigned to agent-A 212, and workstation-B 208 and IP phone-B 218 are assigned to agent-B 210. Notably, the misconfiguration depicted is such that an agent is logged into correct workstation but is misconfigured to log into an incorrect hard/soft phone, e.g., agent-A 212 is correctly logged into workstation-A 206 but incorrectly logged into IP phone-B 218, as illustrated by the dashed lines of FIG. 2. Similarly, agent-B 210 is correctly logged into workstation-B 208 but incorrectly logged into IP phone-A 216. Other misconfigurations may be envisioned.

Next in system 200, suppose a call arrives from a customer at external communication device 112, and enterprise network 214 determines that agent-A 212 is the preferred agent to handle the call. Before enterprise network 214 realizes that agent-A 212 does not have access to workstation-A 206, enterprise network 214 attempts to deliver a call from a customer at external communication device 112 to agent-A 212, by delivering the call to workstation-A 206. The call thus will be not delivered to agent-A 212 and/or will be delivered to an incorrect agent, e.g., agent-B 210.

In some situations, the scenario described above may be less likely when workstation-A 206 and/or workstation-B 208 include a softphone application because agent-A 212 and/or agent-B 210 may have more control over the softphone application and the softphone application may be more tightly integrated with call center application 204.

An additional misconfiguration scenario may occur when call forwarding has been enabled at workstation-A 206 and/or workstation-B 208. Suppose agent-A 212 has taken himself off-line temporarily (e.g., for a scheduled or unscheduled break, lunchtime, etc.). Further suppose that agent-A 212 fails to log off from workstation-A 206. While workstation-A 206 is unattended, a second person—either maliciously or inadvertently—may start using workstation-A 206, and in particular may set up a call forwarding from workstation-A 206 to workstation-B 208. The second person then leaves workstation-A 206. Later, agent-A 212 returns from their break and attempts to use workstation-A 206, even though unbeknownst to agent-A 212 all incoming calls to workstation-A 206 have been forwarded to workstation-B 208. Thereafter, enterprise network 214 will attempt to deliver a call from a customer at external communication device 112 to agent-A 212, but agent-A 212 at workstation-A 206 will not be able to service the call.

Embodiments in accordance with the present disclosure may be useful for situations in which an agent (e.g., agent-A 212 or agent-B 210) prepares to move from an assigned workspace to a second workspace. The agent may enable call forwarding from the assigned IP phone to an IP phone located at the second workspace. The agent does not necessarily log out from the workstation at his assigned workspace. During a time interval between when the agent has forwarded his IP phone calls from the assigned workspace until the agent can log in to the workstation and/or IP phone at the second workspace, there will be a mismatch between agent login for the IP phone and agent login for the workstation. During this time window, ACD and application servers will route a customer call for Agent A in a way that agent A will be unable to service since the agent is not yet logged into the workstation located where the incoming call is being terminated.

In scenarios such as described above, embodiments may benefit by providing an ability for a system administrator to control which calls are delivered to agents when call forwarding is enabled. In presently known systems, there is no automated rule (e.g., in an ACD, app server, etc.) to prevent customer calls from being 112 routed to an agent when the agent's call forwarding is enabled. A system administrator may configure an ACD or the like to inhibit routing of contacts to agents whose call forwarding is enabled. In addition, the ACD, etc., may provide a new feature to notify agents whose call forwarding is enabled that they are not enabled for call routing due to misconfiguration of their setup. Additionally, an app server may have additional feature to notify an agent's supervisor about such misconfiguration situations, and the app server may provide reporting of the misconfiguration.

Embodiments in accordance with an embodiment of the present disclosure address the problems identified above, and are applicable to both static IP configurations and dynamic IP configurations assigned by a dynamic host configuration protocol (DHCP) server. Dynamic IP addresses may be reserved for specific media access control (MAC) IDs in a DHCP server, thus making the dynamic IP addresses appear more like static IP addresses. Once a system administrator reserves dynamic IP addresses for specific MAC IDs, embodiments in accordance with the present disclosure works similarly to the case of static IP addresses. Additionally, an approximate way to detect a mismatch in a dynamic IP environment between workstation login and hard/soft IP phone login is when the logins original from different networks or different subnets.

For static IP configurations, a process in accordance with an embodiment of the invention begins by assuming that an organization (e.g., a corporate Information Technology (IT) administrator) has assigned one or more static IP addresses to an agent work area. The work area may be used by the agent to operate processing or communication equipment that may communicate via a LAN or WAN, such as an IP-enabled telephone or a computer of substantially any configuration executing a softphone application program (e.g., laptop, desktop, tower, tablet, netbook, etc.), smartphone, and so forth. For example, an administrator may assign approximately three to four static IP addresses per agent physical work area. The assigned physical work area may include either a conventional office or a remote home office. A record of the static IP addresses assigned to an agent work area may be maintained by the IT administrator in a Corporate Directory, database, or the like by use of a software tool such as Microsoft Active Directory for Windows domain networks (generically, "corporate directory"). The database storing the assigned IP addresses may be accessible to an IP address configuration verification module, which may be configured to compare the IP address of the agent's workstation to an IP address used for application login, and to verify a match of IP addresses.

Next an authentication server, such as may be used with or incorporated in a private branch exchange (PBX), other communication switch, call manager (CM) or the like, may be incorporated with or communicate with or otherwise configured to access the corporate directory in order to access or be configured to access the record of static IP addresses assigned to the agent work area. This ability to access the assignment of IP addresses will ordinarily be allowed for substantially all agent work areas and static IP addresses under control of embodiments of the present invention.

Next, assume that an agent logs into their workstation, e.g., at the beginning of a work shift, after a lunch break, etc. Login typically involves presentation by a purported agent of credentials (i.e., identification information) such as a login name and a password. The workstation may communicate with the authentication server in order to authenticate the purported agent's credentials. If the credentials are authenticated, then the purported agent is deemed to be the agent identified by the credentials for the purpose of using the workstation, and the agent will be granted access to the resources authorized for the agent to use. The communication between the agent workstation and the authentication server may involve usage of, or be via, an IP software application or communication device such as an IP softphone or IP-enabled phone. After authentication of the agent for the purpose of using the workstation, embodiments may retrieve from memory (e.g., by use the software tool such as Microsoft Active Directory) an indication of an assigned physical work location or work area for the agent (e.g., a desk number, a cubicle number, a connector number, a room number, a coordinate, etc.) along with an indication (e.g., a list) of the static IP addresses associated with the assigned physical work location or work area.

Next, the agent will login to the application program on the workstation that handles the call. The IP address used for the login will be recorded. The application may be, for example, the Contact Center Agent software application. The agent will present identification credentials in a similar manner as when logging into the workstation. The credentials used for logging into the application program may be the same as, or may be different than, the credentials used when logging into the workstation. The agent credentials will be authenticated during application program login in a similar manner to authentication of agent workstation login. The application program may communicate with an authentication server in order to authenticate the purported agent's credentials. If the credentials are authenticated, then the purported agent is deemed to be the agent identified by the credentials for the purpose of using the application program, and the agent will be granted access to the resources authorized for the agent to use. The communication between the application program and the authentication server may involve usage of, or be via, an IP software application or communication device such as an IP softphone or IP-enabled phone. After authentication of the agent for the purpose of using the application program (e.g., the Contact Center Agent software application), embodiments may retrieve from memory an indication of call control information for the present communication session with the agent. Call control information is known as a feature available from an application server. Call control information allows an application server to determine which agent login will receive an incoming call, to determine whether the application server should transfer a call to an agent, to determine whether to allow conference on a call, and so forth.

Next, the authentication server may receive the agent's application program login request. A workstation management central server may look up in a database memory (e.g., by use the software tool such as Microsoft Active Directory) the agent credentials from the application program login, and may retrieve the assigned physical work location or work area for the agent, along with the assigned static IP addresses for the agent's assigned physical work location or work area.

Next, the workstation management central server may transmit to the authentication server the assigned physical work location or work area for the agent as determined by the workstation management central server, which had been retrieved from memory based upon the workstation login.

Next, the authentication server may then compare the assigned IP address as reported by the workstation management central server with the IP address as determined during the agent login to the application program (e.g., the Contact Center Agent software application). If the authentication server determines that there is a mismatch in the reported IP addresses, a warning may be presented to the IP address for the application program login and/or the IP address for the workstation login. Further warnings or error reports may be made as appropriate.

Next, the authentication server may transmit to the workstation management central server the IP address from which the agent logged into the application program. The workstation management central server may then use this information to compare to the IP address from which the agent logged into the workstation. If the workstation management central server determines that there is a mismatch, the workstation management central server may issue a warning to the IP address for the application program login and/or the IP address for the workstation login. The determination may be made by a permission module within the workstation management central server. Other embodiments may deny access by the agent to either the workstation or the application program. Further warnings or error reports may be made as appropriate.

Additional embodiments are applicable to dynamic IP configurations that use Dynamic Host Configuration Protocol (DHCP). Such embodiments may proceed as described above with respect to static IP addresses. However, in addition, a system Administrator may configure a specific IP address to a specific MAC address of both an agent's workstation and the agent's IP-enabled phone. The specific IP address assigned to the agent's workstation and to the agent's IP-enabled phone may then need to be configured into the Active Directory, e.g., by action of a system administrator. In a limited way, for the agent's workstation and for the agent's IP-enabled phone, a static IP environment is simulated in the dynamic IP environment.

Figure 3:
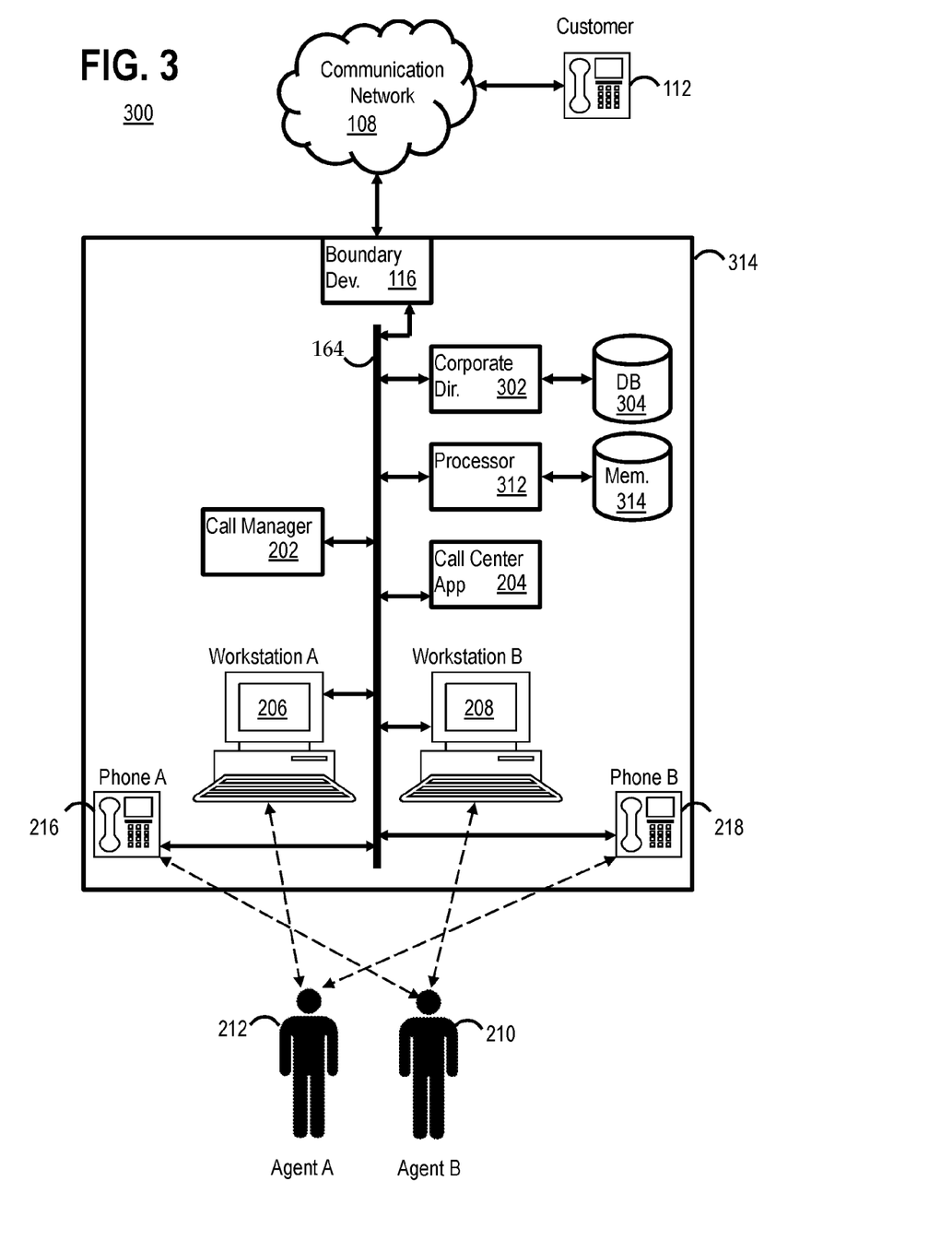
FIG. 3 is a block diagram depicting a system usable during misconfigurations in accordance with an embodiment of the present invention.

FIG. 3 illustrates at a high level of abstraction a system 300 in accordance with an embodiment of the present disclosure. Elements of system 300 bearing a reference number in common with system 200 have been previously described in reference to system 200. System 300 further includes a corporate directory server 302 coupled to LAN 164. Corporate directory server 302 may be communicatively coupled to a database (DB) 304. Database 304 may be incorporated within corporate directory server 302, or may be located within enterprise network 314 but separate from corporate directory server 302, or database 304 may be remotely located (e.g., cloud storage) outside of enterprise network 314. Corporate directory server 302 may be communicatively coupled directly to a database 304 as illustrated in system 300, or (e.g., in the case of cloud storage) may be communicatively coupled to database 304 through communication network 108. System 300 may be useful to implement methods in accordance with an embodiment of the present disclosure.

Figure 4:
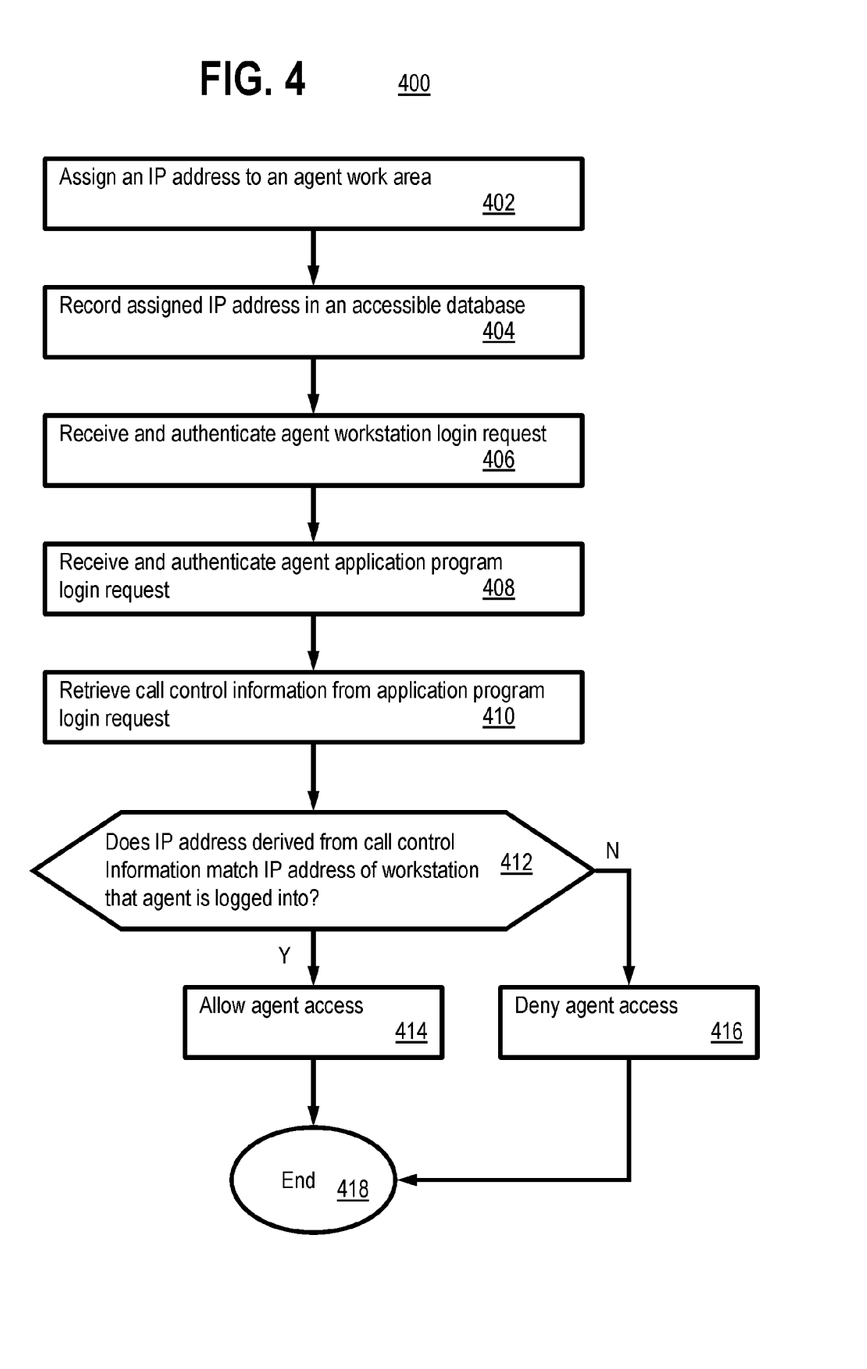
FIG. 4 illustrates typical steps taken during a process in accordance with an embodiment of the present invention.

FIG. 4 illustrates at a high level of abstraction a process 400 in accordance with an embodiment of the present disclosure. Process 400 begins at step 402, at which an IP address is assigned to an agent work area. In some embodiments, the IP address so assigned will be assigned to an agent workstation located at the agent work area.

Next, process 400 transitions to step 404, at which the assigned IP address is recorded in an accessible database, e.g., database 304. The database is accessible by a server such as a server that provides corporate directory 302. In turn, corporate directory 302 may provide information from database 304 to other servers and/or processes within enterprise 314, such as call manager 202 and/or call center application 204.

Next, process 400 transitions to step 406, at which an agent's login request to the workstation is received and authenticated, for example, by an authentication server. The authentication server may be represented in FIG. 4 as processor 312 coupled to memory 314, but also may be illustrated by, e.g., server 144 in FIG. 1. The authentication server may also be implemented by a remote server that is communicatively connected to enterprise network 104 via a secure connection (e.g., a virtual private network (VPN)) through communication network 108. If authentication at step 406 is not successful, then the agent is denied access and process 400 proceeds to step 418 to end. If authentication at step 406 is successful, then the agent is authorized to use the workstation, and control of process 400 transitions to step 408.

At step 408, an agent's login request to a call center application program is received and authenticated, for example, by an authentication server. The authentication server to authenticate login to the call center application program may be, but does not need to be, the same authentication server as used to authenticate login to the workstation. The authentication server may be represented in FIG. 4 as processor 312 coupled to memory 314, but also may be illustrated by, e.g., server 144 in FIG. 1. The authentication server may also be implemented by a remote server that is communicatively connected to enterprise network 104 via a secure connection (e.g., a VPN) through communication network 108. If authentication at step 408 is not successful, then the agent is denied access and process 400 proceeds to step 418 to end. If authentication at step 408 is successful, then the agent is authorized to use the call center application program, and control of process 400 transitions to step 410.

At step 410, a processor (e.g., processor 312) retrieves call control information from the agent's login request to a call center application program. Information may be extracted from the call control information, for example, a source IP address may be extracted from the call control information.

Next, process 400 transitions to decision step 412, at which a comparison is made between the IP address derived from the call control information used to login to the call center application program and the IP address of workstation that the agent is logged into. If the IP addresses match, then control of process 400 transitions to step 414 at which the agent again is granted access to both the workstation and to the call center application program. If the IP addresses do not match, then control of process 400 transitions to step 416 at which the agent is denied access to the workstation and/or to the call center application program. After the conclusion of step 414 or step 416, then control of process 400 may transition to step 418 at which process 400 ends.

Embodiments of the present invention include a system having one or more processing units coupled to one or more memories. The one or more memories may be configured to store software that, when executed by the one or more processing unit, allows practice of the various embodiments, at least by use of processes described herein, including at least in FIG. 4, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method for detecting an Internet Protocol address mismatch in a contact center comprising:
   receiving, by an authentication server, a workstation login request from a first workstation of the contact center, wherein the workstation login request comprises login credentials associated with an agent of the contact center for logging into the first workstation;
   retrieving, by the authentication server, from a contact center database a predetermined first Internet Protocol address assigned to the agent,
   receiving, by the authentication server, an application login request related to an application, wherein the application login request is received from a workstation of the contact center on which the application is executing;
   extracting, by the authentication server, a second Internet Protocol address from the application login request, wherein the second Internet Protocol address is that of the workstation on which the application is executing;
   comparing, by the authentication server, the predetermined first Internet Protocol address with the second Internet Protocol address; and
   granting, by the authentication server, the agent access to the first workstation and the application when the predetermined first Internet Protocol address matches the second Internet Protocol address.

2. The method of claim 1, wherein the contact center database comprises:
   an indication of a respective predetermined physical work area associated with each agent of the contact center, and
   a respective indication of one or more predetermined Internet Protocol addresses associated with each physical work area.

3. The method of claim 2, wherein retrieving the predetermined first Internet Protocol address comprises:
   determining the respective predetermined physical area associated with the agent of the contact center; and
   determining, based on the respective predetermined physical area, the predetermined first Internet Protocol address.

4. The method of claim 1, wherein the application login request comprises:
   login credentials associated with the agent of the contact center for logging into the application, and
   call control information about the workstation on which the application is executing.

5. The method of claim 4, wherein extracting the second Internet Protocol address comprises:
   extracting, from the call control information, the second Internet Protocol address.

6. The method of claim 1, wherein the application comprises a softphone application on the workstation on which the application is executing.

7. The method of claim 1, comprising:
   authenticating, by the authentication server, the workstation login request.

8. The method of claim 1, comprising:
   authenticating, by the authentication server, the application login request.

9. The method of claim 1, wherein the predetermined first Internet Protocol address comprises a static Internet Protocol address.

10. The method of claim 1, wherein when the predetermined first Internet Protocol address and the second Internet Protocol address do not match:
    granting, by the authentication server, the agent access to the first workstation; and
    denying, by the authentication server, the agent access to the application.

11. A system for detecting an Internet Protocol address mismatch in a contact center comprising:
    a memory device, storing executable instructions; and
    a processor in communication with the memory device, the processor when executing the executable instructions:
        receives a workstation login request from a first workstation of the contact center,
            wherein the workstation login request comprises login credentials associated with an agent of the contact center for logging into the first workstation;

retrieves from a contact center database a predetermined first Internet Protocol address assigned to the agent, receives an application login request related to an application, wherein the application login request is received from a workstation of the contact center on which the application is executing;

extracts a second Internet Protocol address from the application login request, wherein the second Internet Protocol address is that of the workstation on which the application is executing;

compares the predetermined first Internet Protocol address with the second Internet Protocol address; and grants the agent access to the first workstation and the application when the predetermined first Internet Protocol address matches the second Internet Protocol address.

12. The system of claim 11, wherein the contact center database comprises:

an indication of a respective predetermined physical work area associated with each agent of the contact center, and a respective indication of one or more predetermined Internet Protocol addresses associated with each physical work area.

13. The system of claim 12, wherein the processor when executing the executable instructions:

determines the respective predetermined physical area associated with the agent of the contact center; and determines, based on the respective predetermined physical area, the first predetermined Internet Protocol address.

14. The system of claim 11, wherein the application login request comprises:

login credentials associated with the agent of the contact center for logging into the application, and call control information about the workstation on which the application is executing.

15. The system of claim 14, wherein the processor when executing the executable instructions:

extracts, from the call control information, the second Internet Protocol address.

16. The system of claim 11, wherein the application comprises a softphone application.

17. The system of claim 11, wherein the processor when executing the executable instructions:

authenticates the workstation login request.

18. The system of claim 11, wherein the processor when executing the executable instructions:

authenticates the application login request.

19. The system of claim 11, wherein, when the predetermined first Internet Protocol address and the second Internet Protocol address do not match, the processor when executing the executable instructions:

grants the agent access to the first workstation; and denies the agent access to the application.

20. A contact center comprising:

a first server configured to assign a respective Internet Protocol address to each of a plurality of workstations in the contact center;

a first memory device storing a database, wherein the database comprises:

an indication of a respective predetermined physical work area associated with each agent of the contact center, and a respective indication of one or more predetermined Internet Protocol addresses associated with each physical work area;

an authentication server comprising:

a second memory device, storing executable instructions; and a processor in communication with the second memory device, the processor when executing the executable instructions:

receives a workstation login request from a first workstation of the contact center;

wherein the workstation login request comprises login credentials associated with an agent of the contact center for logging into the first workstation;

retrieves from the database a predetermined first Internet Protocol address assigned to the agent, receives an application login request related to an application, wherein the application login request is received from a workstation of the contact center on which the application is executing;

extracts a second Internet Protocol address from the application login request, wherein the second Internet Protocol address is that of the workstation on which the application is executing;

compares the predetermined first Internet Protocol address with the second Internet Protocol address, and grants the agent access to the first workstation and the application when the predetermined first Internet Protocol address matches the second Internet Protocol address; and a network medium connecting the first server, the first memory device, and the authentication server.

* * * * *